United States Patent
Chen et al.

(10) Patent No.: US 8,312,010 B1
(45) Date of Patent: Nov. 13, 2012

(54) LOCAL BUSINESS RANKING USING MAPPING INFORMATION

(75) Inventors: Johnny Chen, Mountain View, CA (US); Clarence Chris Mysen, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 478 days.

(21) Appl. No.: 11/840,202

(22) Filed: Aug. 16, 2007

(51) Int. Cl.
*G06F 17/30* (2006.01)

(52) U.S. Cl. ...................................................... 707/723

(58) Field of Classification Search .................. 707/723, 707/724, 725, 999.003
See application file for complete search history.

(56) References Cited

U.S. PATENT DOCUMENTS

| | | | |
|---|---|---|---|
| 6,963,867 B2 | 11/2005 | Ford et al. | |
| 7,617,209 B2 | 11/2009 | Whitman et al. | |
| 7,627,548 B2 | 12/2009 | Riley et al. | |
| 7,685,119 B2 | 3/2010 | Riise et al. | |
| 7,840,577 B2 | 11/2010 | Ortega et al. | |
| 7,925,657 B1 | 4/2011 | Pfleger et al. | |
| 8,131,722 B2 | 3/2012 | Sundaresan et al. | |
| 2002/0152204 A1 | 10/2002 | Ortega et al. | |
| 2005/0065916 A1* | 3/2005 | Ge et al. | 707/3 |
| 2005/0149498 A1 | 7/2005 | Lawrence et al. | |
| 2006/0149734 A1* | 7/2006 | Egnor et al. | 707/7 |
| 2006/0149800 A1* | 7/2006 | Egnor et al. | 707/205 |
| 2006/0179044 A1 | 8/2006 | Rosenberg | |
| 2006/0271531 A1* | 11/2006 | O'Clair et al. | 707/5 |
| 2007/0073717 A1 | 3/2007 | Ramer et al. | |
| 2007/0118512 A1 | 5/2007 | Riley et al. | |
| 2007/0218900 A1* | 9/2007 | Abhyanker | 455/435.1 |
| 2007/0239671 A1 | 10/2007 | Whitman et al. | |
| 2007/0276810 A1* | 11/2007 | Rosen | 707/3 |
| 2007/0288437 A1* | 12/2007 | Xia | 707/3 |
| 2008/0005101 A1 | 1/2008 | Chandra | |
| 2008/0015928 A1* | 1/2008 | Chandra | 705/10 |
| 2008/0154856 A1* | 6/2008 | Riise et al. | 707/3 |
| 2008/0243821 A1* | 10/2008 | Delli Santi et al. | 707/5 |

FOREIGN PATENT DOCUMENTS

WO  WO2005/066841  7/2005

\* cited by examiner

*Primary Examiner* — Kimberly Wilson
*Assistant Examiner* — Mohammed R Uddin
(74) *Attorney, Agent, or Firm* — Bracewell & Giuliani, LLP

(57) ABSTRACT

Methods, systems, and apparatus, including computer program products, for ranking local businesses. One or more signals indicating one or more actions related to a plurality of business listings are received. The business listings are ranked based on the signals. A search query is received, and in response to the search query, one or more of the business listings are presented in an order based at least on the ranking.

15 Claims, 7 Drawing Sheets

LOCAL BUSINESS RANKING USING MAPPING INFORMATION

BACKGROUND

The subject matter of this specification relates generally to search systems.

Local business searching has become a popular feature in some search engines. Local business search helps users find businesses near a particular geographic location that can serve their needs. Local business search can benefit businesses by providing additional exposure. Local business search can benefit consumers by providing consumers a convenient way to find local businesses.

Many search engines perform some kind of ranking on search results, to give the user some basis of comparison amongst search results. Any number of signals can be used for the ranking. For local business search, signals that indicate popularity, ratings or the like are not readily available. As a result, the rankings of local businesses in a local business search may be less informative.

SUMMARY

In general, one aspect of the subject matter described in this specification can be embodied in methods that include the actions of receiving one or more signals indicating one or more actions related to a plurality of business listings, ranking the business listings based on the signals, receiving a search query, and in response to the search query, presenting one or more of the business listings in an order based at least on the ranking. Other embodiments of this aspect include corresponding systems, apparatus, computer program products, and computer readable media.

Particular embodiments of the subject matter described in this specification can be implemented to realize one or more of the following advantages. Local businesses can be ranked by the level of interest users show in the respective businesses, as indicated by user actions on maps indicating the businesses. Local businesses can be compared relative to each other on criteria other than location. Association analysis can be performed on the user actions to determine possible business recommendations based on past groups of searches or to predict business in which the user is interested.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
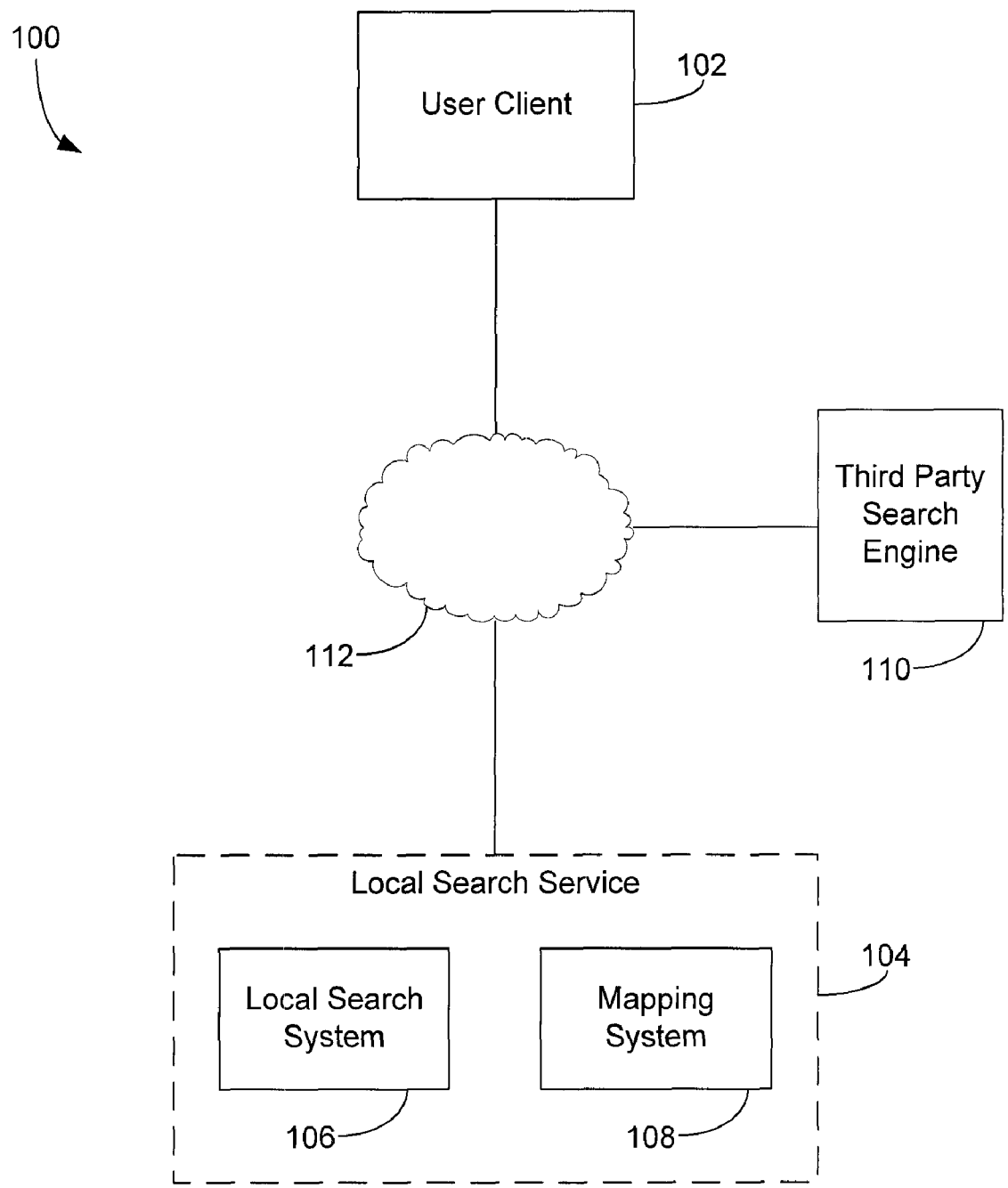
FIG. 1 is a block diagram illustrating an example network environment.

FIG. 1 illustrates an example network environment 100. The network environment 100 includes a user client 102, a local search system 106, a mapping system 108, and optionally a third-party search engine 110. These components are coupled by one or more networks 112. Examples of the one or more networks 112 include local area networks, wide area networks, wireless networks, peer-to-peer networks, and the Internet.

The local search system 106 provides access to services for searching for businesses in the vicinity of a specified location. Users accessing the local search system 106 can enter a query that specifies a location and one or more keywords (which can be a complete or partial name of a business). The local search system 106 returns as search results listings of businesses in the vicinity of the specified location that match or are associated with the entered keyword(s). In some implementations, the results can be displayed on a map, in conjunction with the mapping system 108.

The mapping system 108 provides access to mapping services. The mapping system 108 accepts location data (e.g., an address) as input, generates a map by identifying map images appropriate for the input location data and a map scale level, and transmits the generated map for presentation to a user. In some implementations, the mapping system 108 can also accept an origin location and a destination location as inputs, determine a route (e.g., a driving route with directions) between the origin location and the destination location, and display the route on the appropriate map images. In some implementations, the map images include street map images and optionally satellite images of locations.

In some implementations, the local search system 106 and the mapping system 108 are component systems of a local search service 104.

The third-party search engine 110 can also provide access to local search services. The third-party search engine 110 is external to the local search system 106 and mapping system 108. The local search services provided by third-party search engine 110 can be different from that provided by local search system 106. For example, the third-party search engine 110 can offer city-specific searches and additional content (e.g., reviews, city guides, etc.). In some implementations, the third-party search engine 110 can transmit data to the mapping system 108. The mapping system 108 identifies the relevant map images based on the transmitted data. The map images can be embedded into a page generated by the third-party search engine 110. In some implementations, the third-party search engine 110 transmits data to the mapping system 108 using an application programming interface (API). Thus, in some implementations, the third-party search engine receives map data that is syndicated from mapping system 108; the third-party search engine is a syndicated mapping service.

The user client 102 facilitates user access to the local search system 106, mapping system 108, and/or the third-party search engine 110. In some implementations, the user client 102 is a device that can connect to the network 112. The user client 102 transmits data to and receives data from systems and other devices directly or through the network 112. Examples of devices that can be a user client include desktop computers, notebook computers, tablet computers, personal digital assistants, mobile phones, smartphones, and other fixed and mobile electronic devices.

Figure 2:
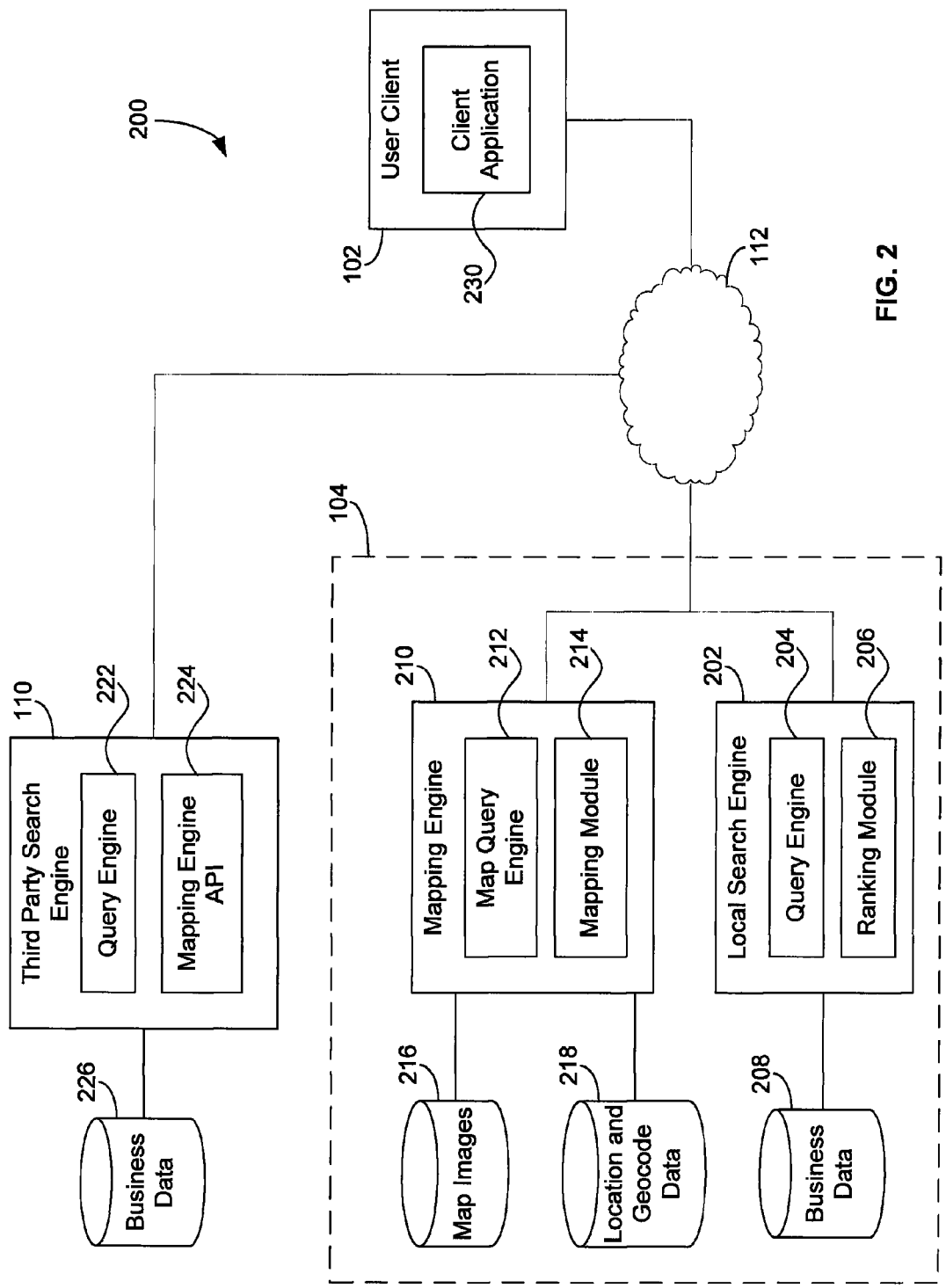
FIG. 2 is a block diagram illustrating an example local business search system.

FIG. 2 illustrates an example local business search system 200. In some implementations, the local business search system 200 is implemented in the network environment 100.

The local business search system 200 includes a local search engine 202 and a mapping engine 210. In some implementations, the local search engine 202 is a part of the local search system 106, and the mapping engine 210 is a part of the mapping system 108. The local search engine 202 and the mapping engine 210 can be parts of the local search service 104.

The local search engine 202 includes a query engine 204, a ranking module 206, and business data 208. The query engine 204 receives queries for businesses, finds the businesses in the business data 208 that matches the queries, and returns the matching businesses as search results to a user client 102. The ranking module 206 ranks the businesses included in the business data 208 based on one or more criteria. Further details regarding the ranking of the businesses are described below.

The business data 208 includes information regarding businesses. The business data 208 can include listings of businesses and data associated with the businesses. The business listings can include, for a particular business, the name and contact information (e.g., physical address, phone number, fax number, email address, website URL, etc.) of the business. Other information associated with a business (e.g., a picture of the physical storefront of the business, etc.) can be stored in the business data 208 as well. In some implementations, the business data 208 is implemented as a database (e.g., a MySQL® database).

The mapping engine 210 includes a map query engine 212, a mapping module 214, map images 216, and location and geocode data 218. The map query engine 212 receives queries for locations (e.g., addresses), matches the locations to the appropriate geocodes, identifies the map images in map images 216 that correspond to the matched geocodes and nearby areas, and returns the map images to the mapping module 214. In some implementations, the map query engine 212 can also accept a query for a route between a starting location and a destination location. The map query engine 212 determines a route between the two locations and generates a map on which the locations and the route can be presented.

The mapping module 214 generates maps by piecing together map images (e.g., street map images, topographical map images, satellite images of locations, etc.) and transmitting the images to a user client for presentation to a user. The mapping module 214 can also retrieve and transmit map images of different scales in response to user requests to zoom in or zoom out on a map. Further, the mapping module 214 can overlay other information on the map images for presentation to the user. For example, the mapping module 214 can overlay location markers, a route and waypoints on the route that are associated with driving directions, etc., on the map images.

Map images 216 is a data store of images from which maps can be generated. The map images can include, for example, street map images and satellite images. Map images 216 includes images that show a location at various scales, so that a map can be zoomed in or out refreshing the map using map images at a different scale.

Location and geocode data 218 includes mappings between locations and geocodes. The locations can include street addresses and street number ranges, landmarks, etc. For example, in some implementations, the location and geocode data 218 can be a database of addresses mapped to latitude-longitude coordinates or some other geographic coordinate system.

In some implementations, the system 200 includes a third party search engine 110. The third party search engine 110 includes a query engine 222, a mapping engine API 224, and business data 226. The third party search engine 110 can have its own set of business data 226. The query engine 222 receives queries, matches the queries to matching businesses in business data 226, and returns the matching businesses to a user client 102.

In some implementations, the query engine 222 can generate a result page that includes an embedded map generated by mapping engine 210. The third party search engine 110 transmits a request to generate a map and the needed information for generation of the map to the mapping engine 210 using a mapping engine API 224. The mapping engine 210 receives the information, generates the map, and transmits the generated map to the third party search engine 110 using the API.

A user client 102 provides access to the local search engine 202, mapping engine 210, and the third party search engine 110. In some implementations, a user accesses the engines through a client application 230 (e.g., a web browser).

In some implementations, the local search engine 202 can include other content along with the search results. For example, the search results page can include links to reviews of a business, additional details about the business, an image of the storefront of the business, and links to webpages that have content relating to the business. In some implementations, the local search engine 202 includes a crawler module (not shown) for crawling other content providers (e.g., third party search engine 110, websites, etc.) for these additional content for inclusion in the search results page.

In some implementations, the local search engine 202 can return search results in conjunction with the mapping engine 210. For example, when the local search engine 202 receives a query, the query engine 204 identifies listings of matching businesses in the business data 208. The local search engine 202 transmits the addresses of the matching businesses to the mapping engine 210. The map query engine 212 matches the business addresses to geocodes and identifies the map images corresponding to the geocodes. The local search engine 202 generates a search results page that includes an embedded map. The embedded map is generated by the mapping module 214 from the identified map images and includes markers indicating the matching businesses and other information.

The local search engine 202, mapping engine 210, third party search engine 110, and the user client 102 can be connected by one or more networks 112.

Figure 3A:
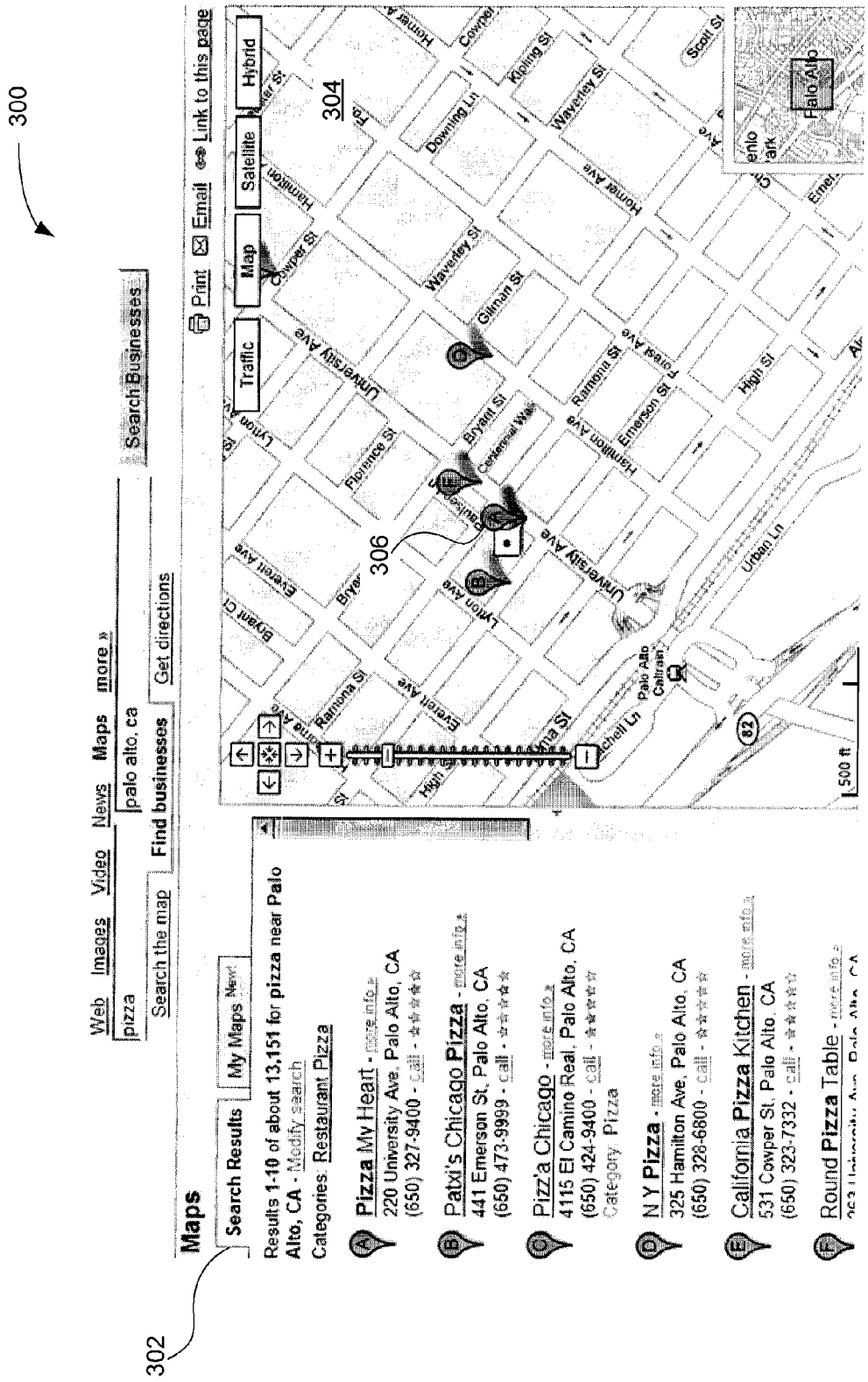
FIGS. 3A-3B illustrate example user interfaces of a local search engine.
Figure 3B:
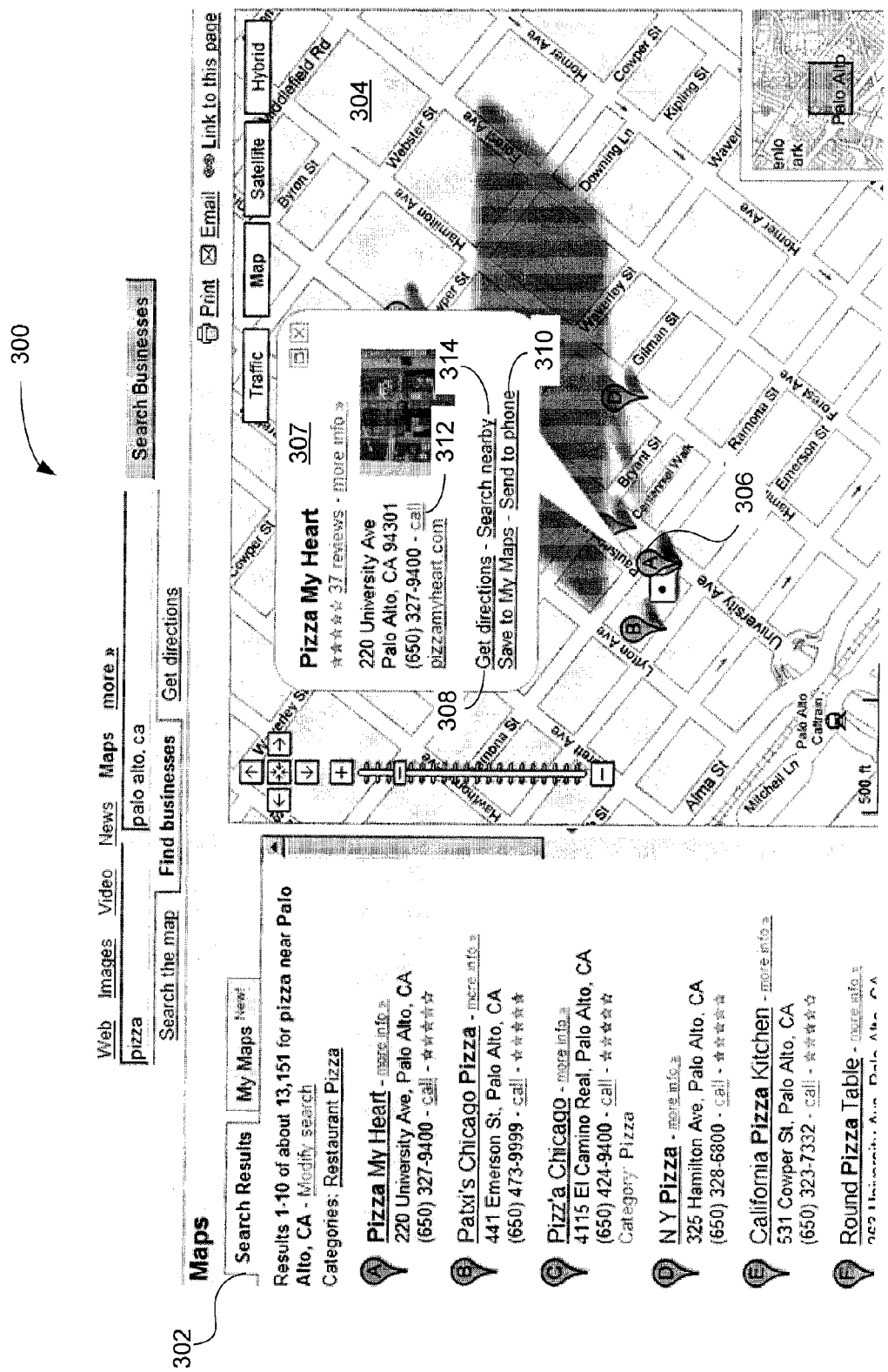

FIGS. 3A-3B illustrate an example search results page 300 with an embedded map, which can be rendered and displayed by a web browser. The search results page 300 includes a list 302 of listings of businesses that match the search query. In the search results pages 300 shown in FIGS. 3A-3B, the query is the keyword "pizza" and the location "palo alto, ca." The matching businesses list 302 shows, for a matching business, its name, contact information, and optionally additional information (e.g., a rating). The page 300 includes a map 304, which is generated by mapping engine 210. The map displays one or more location markers 306 indicating the locations of one or more of the businesses in the matching businesses list 302. The search results page 300 is generated by the local search engine 202 and transmitted to user client 102 for presentation to the user in a client application 230.

When a user selects a business name in the matching businesses list 302 or a marker 306, additional information 307 related to the selected business is displayed. The additional information 307 can include links to additional features or content related to the corresponding business. In some implementations, the links include a link 308 to request driving directions to the business, a link 310 to have the name and contact information of the business sent to a device (e.g., to a mobile phone or smartphone by SMS), a link 312 to initiate a phone connection between the phone number of the business and a phone number specified by the user, and a link 214 to open a search box for searching for businesses near the matching business. User selection of any of these links can be used as a signal for ranking the business, as described in further detail below.

In some implementations, the additional information 307 can include a thumbnail of the storefront of the business and a link to an image of the storefront of the business. Selection of the link to the image of the storefront of the business can also be used as a signal for ranking the business.

Figure 4:
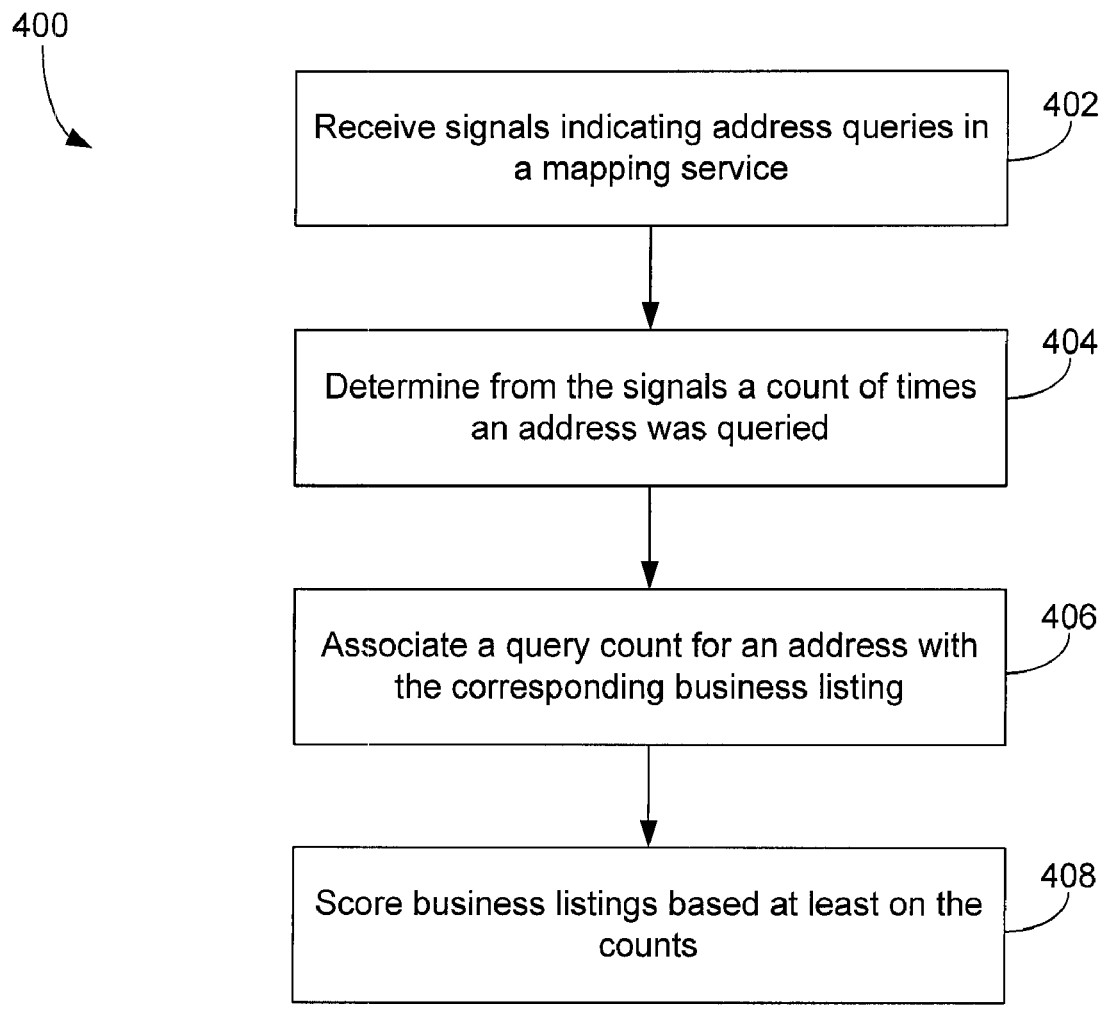
FIG. 4 is a flow diagram illustrating an example process for ranking business listings.

The businesses in the matching businesses list 302 can be ordered within the list 302 based on a ranking of the businesses. FIG. 4 illustrates an example process 400 for ranking business listings. For convenience, the process 400 will be described in reference to a system (e.g., system 200) that performs the operations of the process.

One or more signals indicating address queries in a mapping service are received (402). In some implementations, the mapping engine 210 can receive address queries, which are requests to the mapping engine 210 to generate maps with the positions of the queried addresses indicated on the maps. In these implementations, the queries are the signals. In some other implementations, the third party search engine 110 can receive queries for addresses. The third party search engine 110 makes requests to the mapping engine 210, through the mapping engine API 224, to generate maps indicating the queried addresses. In these implementations, the signals are the requests from the third party search engine 110 to the mapping engine 210, through the API 224, for maps indicating the queried addresses. In one implementation, the signals include both address queries directly submitted to the mapping engine 210 and requests for maps submitted by the third party search engine 110 through the API 224.

For each distinct address included in the signals, a count for the address is maintained (404). Thus, for example, whenever an address is queried, a count for the address is incremented. The count tracks the number of times the address has been queried. In some implementations, the counts are maintained at the mapping engine 210.

A query count for an address is associated with a corresponding business (406). For an address, the address and its count are transmitted to the local search engine 202. The address is matched with a business listing in business data 208. If a matching business for the address is found, the count is associated with the business listing in the business data 208.

The businesses listings in the business data are scored based at least on their associated counts (408). For a business listing, a score can be calculated based on its query count and possibly additional factors. The scores provide a basis of relative comparison between the business listings; the business listings can be ranked and ordered based on the scores. For example, in the list of matching businesses 302, the businesses can be presented in an order based on their scores, with the business listings with higher scores presented closer to the top of the list.

Figure 5:
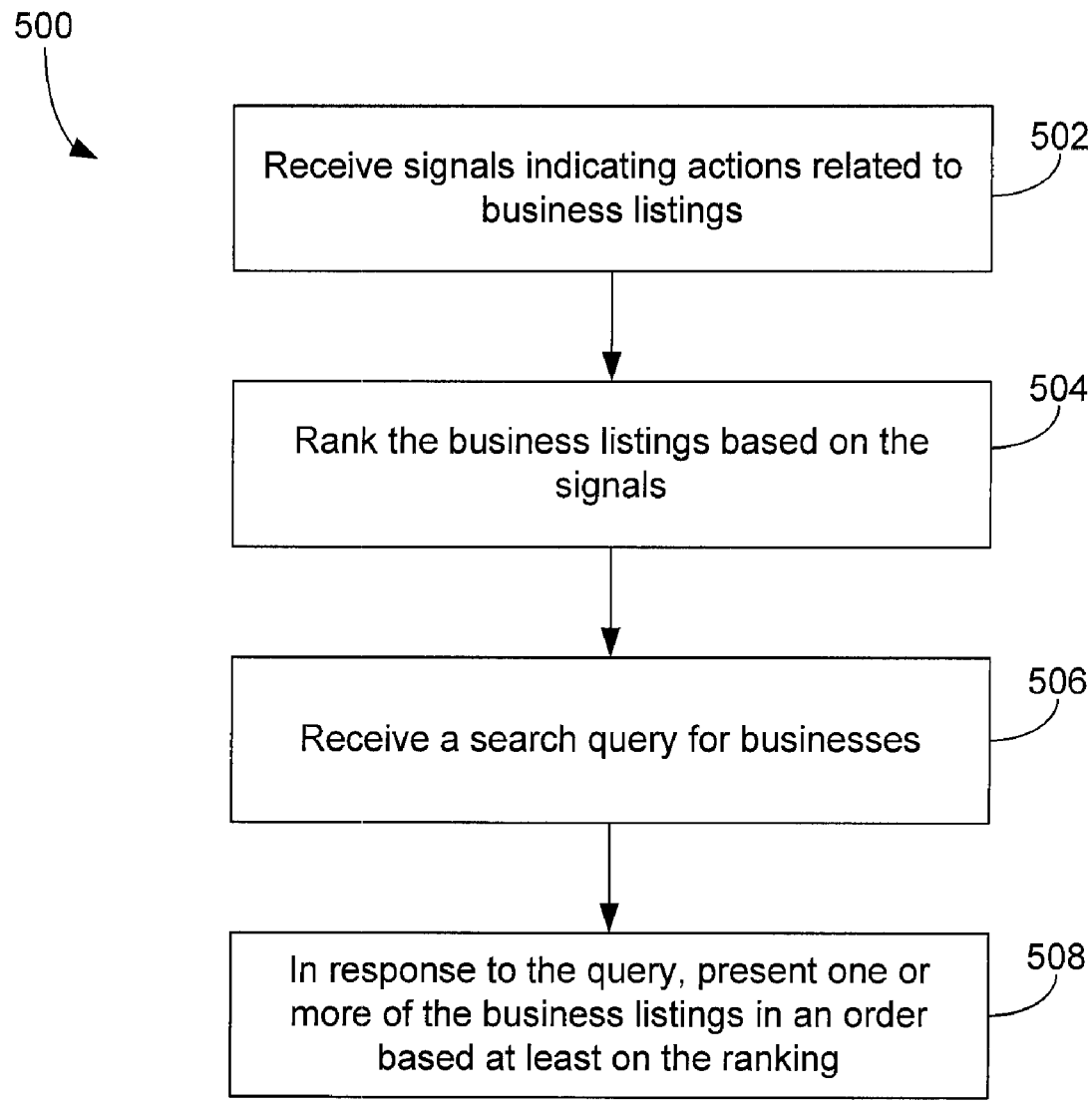
FIG. 5 is a flow diagram illustrating an example process for ranking and presenting business listings.

FIG. 5 is a flow diagram illustrating an example process 500 for ranking and presenting business listings. Process 400, which describes scoring a business listing based on the number of queries of the business' address, is an example of an operation in process 500. For convenience, the process 500 will be described in reference to a system (e.g., system 200) that performs the operations of the process.

Signals indicating actions related to business listings are received (502). A signal can be any indication of an action related to a business listing. A signal provides, for example, a hint of user interest in a particular business. An example of a signal indicating an action related to a business listing is a query for an address corresponding to a business, described above in relation to FIG. 4; the user submitting the query shows some interest in the business by querying its address.

Another example of a signal indicating an action related to a business listing is a user action related to a business listing on a map generated by a mapping service (e.g., mapping engine 210). As described above in relation to FIGS. 3A-3B, a search result page 300 includes a matching businesses list 302 of business listings and can indicate locations of the matching businesses on a map 304. When the search result page 300 is presented to a user, the user can interact with the search results page 300. An example of a user action is a selection of a business listing in the matching businesses list 302 or a map marker 306 corresponding to the business. In response to the user selection of the business listing or the map marker, additional information 307 corresponding to the selected business is displayed. Another example of a user action is a selection of any of the links 308 (get directions to the business), 310 (request transmission of the business listing to a mobile phone), 312 (establish connection between the business phone number and a user-specified phone number), 314 (searching for nearby businesses), or a link to a full-size image of the storefront of the business. When any of these links are selected, a corresponding request is sent to the mapping engine 208, at which the request is processed by the mapping engine 208.

In some implementations, further examples of user actions that can be used as signals include requests for map information for a business made from a toolbar add-on to a web browser or some other application, email content (e.g., a user includes the address of a business in an email), or a number of page views on pages that show a business address.

Yet another example of a signal is a query to the local search engine 202 for a particular type of business within the vicinity of a particular location. For example, a user can query for "pizza" restaurants near "Palo Alto, Calif." The search results for the query are businesses that satisfy the query. The query provides some hint of interest in the businesses included in the search results.

In some implementations, map data requests from a third party search engine 110, submitted through an API 224, can also be used as signals for ranking businesses. A third party search engine 110 can make the requests when a user searches for businesses at the third party search engine 110 and requests a map of the matching businesses. Similar to the address query or the query for businesses near a location, the searches at the third party search engine 110 provide a hint that users are interested in certain businesses.

As described above, any of the above user actions can be used as a signal for ranking businesses. When a user action is performed for a particular business, a count associated with the business and for the type of the signal (e.g., an address query, a request for directions, etc.) is updated. In some implementations, the counts are maintained at the mapping engine 210 and/or local search engine 202.

In some implementations, multiple signals (e.g., the various counts for actions described above, etc.) can be used to rank businesses. For example, the signals can be combined in a weighted manner, and the combined signal is used to determine rankings for businesses. An example of combining signals is further described below.

Businesses are ranked based on the signals (504). In some implementations, the signals that have been collected and counted, as described above, are used to score the businesses, and the businesses are ranked based on their scores. For a particular business, the score can be calculated by combining the counts, associated with the business, for each type of signal. In some implementations, the counts are combined in a linear combination (e.g., score=$aC_1+bC_2+$ . . . ), with weights a, b, etc. and counts $C_1$, $C_2$, etc. for each type of signal.

In some implementations, certain signals are weighted more highly than others to reflect their relative value in indicating interest in a business. For example, signals corresponding to business type queries can be given a small weight (e.g., 0.01). Signals corresponding to map requests for an address that matches a business or signals corresponding to requests from third party search engine 110 can be given a larger weighted (e.g., 0.10). Signals corresponding to user actions on a map (e.g., request for directions to a business, request to call a business, etc.) can be given an even larger weight (e.g., 1.00).

A search query for businesses is received (506). A user can submit a query to the local search engine 202 from a user client 102.

In response to the query, one or more businesses are presented in an order based on the ranking (508). The local search engine 202 receives the query and looks in the business data 208 for businesses that match the query. For example, if the query is for "sushi near mountain view, ca," the query engine 204 looks in the business data 208 for sushi restaurants in the vicinity of Mountain View, Calif. The query engine 204 also retrieves the scores of the matching businesses.

The matching businesses are inserted into a search results list 302, and are ordered in the list based at least on their scores that were calculated from the collected signals. That is, a business with a higher score is displayed higher in the list. In some implementations, the distance of the business from the location specified in the query can also affect the ordering, along with the score. For example, the distance and the score calculated from the signals can be combined into a combined score using a linear combination, with the distance weighted by a first weight and the score calculated from the signal weighted by a second weight. The search results list 302 is transmitted to a user client 102 for presentation to a user.

Figure 6:
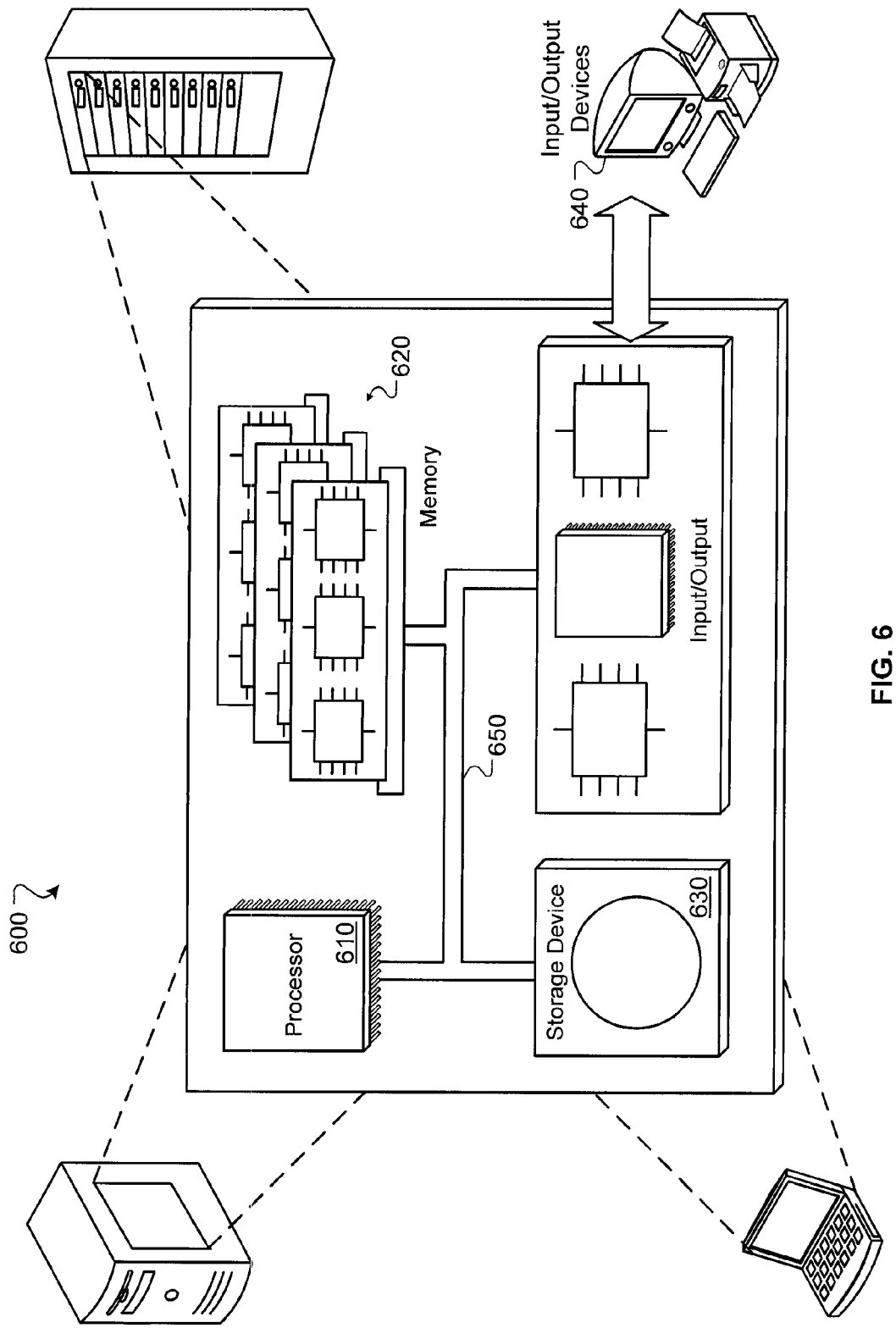
FIG. 6 is a block diagram illustrating a generic computer system.

FIG. 6 is a schematic diagram of a generic computer system 600. The system 600 can be used for practicing operations described in association with the techniques 400 and 500. The system 600 can include a processor 610, a memory 620, a storage device 630, and input/output devices 640. Each of the components 610, 620, 630, and 640 are interconnected using a system bus 650. The processor 610 is capable of processing instructions for execution within the system 600. Such executed instructions can implement one or more components of local search engine 202 or mapping engine 210, for example. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 is a computer readable medium such as volatile or non-volatile memory that stores information within the system 600. The memory 620 could store data structures representing business data 208, map images 216, or location and geocode data 218, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A computer-implemented method, comprising:
maintaining, for each listing in a plurality of business listings, a respective count for each of a plurality of types of user actions related to the business listing, the plurality of types of user actions including business type query actions, map requests for an address associated with a listing and user actions on a map;
determining, for each listing in the plurality of business listings, a weighted count for the business listing by weighting each of the respective counts for the business listing according to the type of user action, wherein a respective count for a user action associated with a request to contact a business is weighted more than the respective counts of the other types of user actions, and wherein the weighted count is a linear combination that includes a sum of product terms $aC_1, bC_2, \ldots, zC_n$, where each of the counts $C_1, C_2, \ldots, C_n$ for a type of user action is weighted by a respective weight $a, b, \ldots, z$;
ranking, by a processor, the business listings based at least in part on the weighted counts for the business listings;
receiving a search query; and
in response to the search query, presenting one or more of the business listings in an order based at least on the ranking.

2. The method of claim 1, wherein the user actions comprise one or more interactions associated with a first business listing of the business listings in a mapping service.

3. The method of claim 2, wherein the interactions comprise a user request to dial a phone number associated with the first business listing.

4. The method of claim 2, wherein the interactions comprise a user request for directions to an address associated with the first business listing.

5. The method of claim 2, wherein the interactions comprise a user request to present a review of the first business listing.

6. The method of claim 2, wherein the interactions comprise a user request to have the first business listing transmitted to a mobile device.

7. The method of claim 2, wherein the interactions comprise a user selection of a map location marker corresponding to the first business listing in the mapping service.

8. The method of claim 1, wherein one of the business type query actions comprises a query for an address associated with a business listing through a search engine interface.

9. The method of claim 1, wherein one of the business type query actions comprises a request for mapping data by a syndicated mapping service, the mapping data including data associated with a business listing.

10. The method of claim 9, wherein the request comprises a request of the mapping data through an application programming interface.

11. The method of claim 1, wherein ranking a respective business listing comprises:
determining a score for the respective business listings using the respective weighted counts maintained for the business listing, including the respective weighted counts for the plurality of types of user actions.

12. The method of claim 1, wherein weighting each of the respective counts according to the type of user action includes weighting each of the respective counts to reflect the relative value of the user action associated with the respective count in indicating user interest in the business.

13. A system, comprising:
one or more processors; and
instructions configured for execution by the one or more processors, the instructions when executed, cause the one or more processors to perform operations comprising:
maintaining, for each of a plurality of business listings, a respective count for each of a plurality of types of user actions related to the business listing, the plurality of types of user actions including business type query actions, map requests for an address associated with a listing and user actions on a map;
determining, for each of the plurality of business listings, a weighted count by weighting each of the respective counts for the business listing according to the type of user action, wherein a respective count for a user action associated with a request to contact a business is weighted more than the respective counts of the other types of user actions, and wherein the weighted count is a linear combination that includes a sum of product terms $aC_1, bC_2, \ldots, zC_n$, where each of the counts $C_1, C_2, \ldots, C_n$ for a type of user action is weighted by a respective weight $a, b, \ldots, z$;
ranking, by a processor, the business listings based at least in part on the weighted counts for the business listings;
receive a search query; and
present, in response to the search query, one or more of the business listings in an order based at least on the ranking.

14. A non-transitory computer-readable storage medium, having instructions stored thereon, which, when executed by one or more processors, cause the one or more processors to perform operations comprising:
maintaining, for each of a plurality of business listings, a respective count for each of a plurality of types of user actions related to the business listing, the plurality of types of user actions including business type query actions, map requests for an address associated with a listing and user actions on a map;
determining, for each of the plurality of business listings, a weighted count by weighting each of the respective counts for the business listing according to the type of user action, wherein a respective count for a user action associated with a request to contact a business is weighted more than the respective counts of the other types of user actions, and wherein the weighted count is a linear combination that includes a sum of product terms $aC_1, bC_2, \ldots, zC_n$, where each of the counts $C_1, C_2, \ldots, C_n$ for a type of user action is weighted by a respective weight $a, b, \ldots, z$;
ranking, by a processor, the business listings based at least in part on the respective weighted counts for the business listings,
receiving a search query; and
in response to the search query, presenting one or more of the business listings in an order based at least on the ranking.

15. A system, comprising:
one or more computer processors;
means for maintaining, for each of a plurality of business listings, a respective count for each of a plurality of types of user actions related to the business listing, the plurality of types of user actions including business type query actions, map requests for an address associated with a listing and user actions on a map;
determining, for each of the plurality of business listings, a weighted count by weighting each of the respective counts for the business listing according to the type of user action and in which a respective count for a user action associated with a request to contact a business is weighted more than the respective counts of the other types of user actions, and wherein the weighted count is a linear combination that includes a sum of product terms $aC_1, bC_2, \ldots, zC_n$, where each of the counts $C_1, C_2, \ldots, C_n$ for a type of user action is weighted by a respective weight $a, b, \ldots, z$;
means for ranking the business listings based at least in part on the weighted counts for the business listings;
means for receiving a search query; and
means for presenting, in response to the search query, one or more of the business listings in an order based at least on the ranking.

\* \* \* \* \*